(12) United States Patent
Aldrin

(10) Patent No.: US 6,827,313 B1
(45) Date of Patent: Dec. 7, 2004

(54) MULTI-CREW MODULES FOR SPACE FLIGHT

(76) Inventor: Buzz Aldrin, 10380 Wilshire Blvd., #703, Los Angeles, CA (US) 90024

( * ) Notice: Subject to any disclaimer, the term of this patent is extended or adjusted under 35 U.S.C. 154(b) by 0 days.

(21) Appl. No.: 10/738,675

(22) Filed: Dec. 16, 2003

(51) Int. Cl.[7] .............................................. B64G 1/40
(52) U.S. Cl. .................................. 244/162; 244/158 R
(58) Field of Search ................................ 244/162, 161, 244/158 R

(56) References Cited

U.S. PATENT DOCUMENTS

| | | | |
|---|---|---|---|
| 2,941,764 A | * 6/1960 | Lee, Jr. et al. | 244/140 |
| 2,977,080 A | 3/1961 | Van Zborowski | |
| 3,289,974 A | * 12/1966 | Cohen et al. | 244/162 |
| 3,374,965 A | 3/1968 | Deutsch | |
| D220,980 S | * 6/1971 | Webb | D12/334 |
| 3,702,688 A | * 11/1972 | Faget | 244/162 |
| 3,999,728 A | * 12/1976 | Zimmer | 244/140 |
| 4,451,017 A | 5/1984 | Marshall | |
| 4,580,746 A | 4/1986 | Peck | |
| 4,792,108 A | * 12/1988 | Bull | 244/159 |
| 4,834,324 A | * 5/1989 | Criswell | 244/160 |
| 5,064,151 A | * 11/1991 | Cerimele et al. | 244/160 |
| 5,143,327 A | * 9/1992 | Martin | 244/158 R |
| 5,143,328 A | * 9/1992 | Leonard | 244/158 R |
| 5,186,419 A | * 2/1993 | Scott | 244/158 R |
| 5,217,187 A | * 6/1993 | Criswell | 244/158 R |
| 5,397,082 A | 3/1995 | Scott | |
| 5,526,999 A | 6/1996 | Meston | |
| 5,799,902 A | 9/1998 | Keith et al. | |
| 6,360,994 B2 | * 3/2002 | Hart et al. | 244/158 R |
| 6,446,905 B1 | * 9/2002 | Campbell et al. | 244/2 |
| 6,557,803 B2 | * 5/2003 | Carpenter et al. | 244/162 |
| 6,612,522 B1 | * 9/2003 | Aldrin et al. | 244/2 |
| 6,616,092 B1 | 9/2003 | Barnes et al. | |
| 6,666,409 B2 | * 12/2003 | Carpenter et al. | 244/162 |
| 6,685,141 B2 | * 2/2004 | Penn | 244/162 |
| 2002/0139901 A1 | * 10/2002 | Penn | 244/162 |
| 2003/0183727 A1 | * 10/2003 | Carpenter et al. | 244/162 |

OTHER PUBLICATIONS

"Saturn—5 US Moon Rocket—Apollo Saturn V Moon Rocket", pp. 1–2, www.aerospaceguide.net/saturn_5.html.*

* cited by examiner

*Primary Examiner*—Michael J. Carone
*Assistant Examiner*—Stephen A Holzen
(74) *Attorney, Agent, or Firm*—Charles Berman, Esq.; Mark Krietzman, Esq.; Greenberg Traurig LLP

(57) ABSTRACT

A system for launching a space for humans into orbit comprises a launch vehicles. There are multiple separate crew modules mounted in relationship to the launch vehicle. The multiple crew modules are nested around the circumference of the launch vehicle. Alternatively or additionally, there are multiple separate crew modules located in a pod relatively directed along the length of the launch vehicle. A single rocket is for launching the multiple space crew modules. The separate crew module return from orbit to Earth separately.

15 Claims, 10 Drawing Sheets

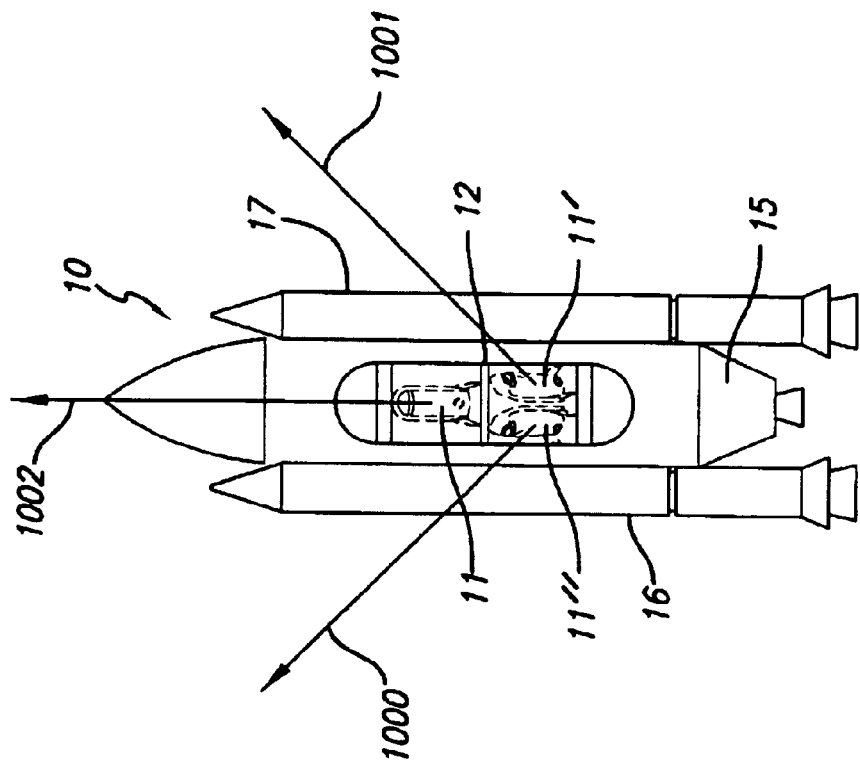
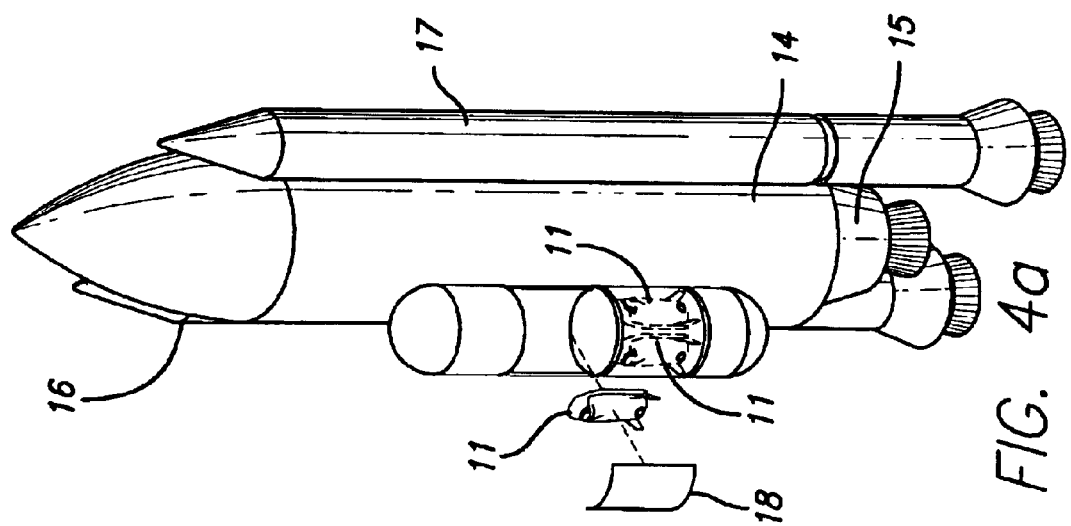

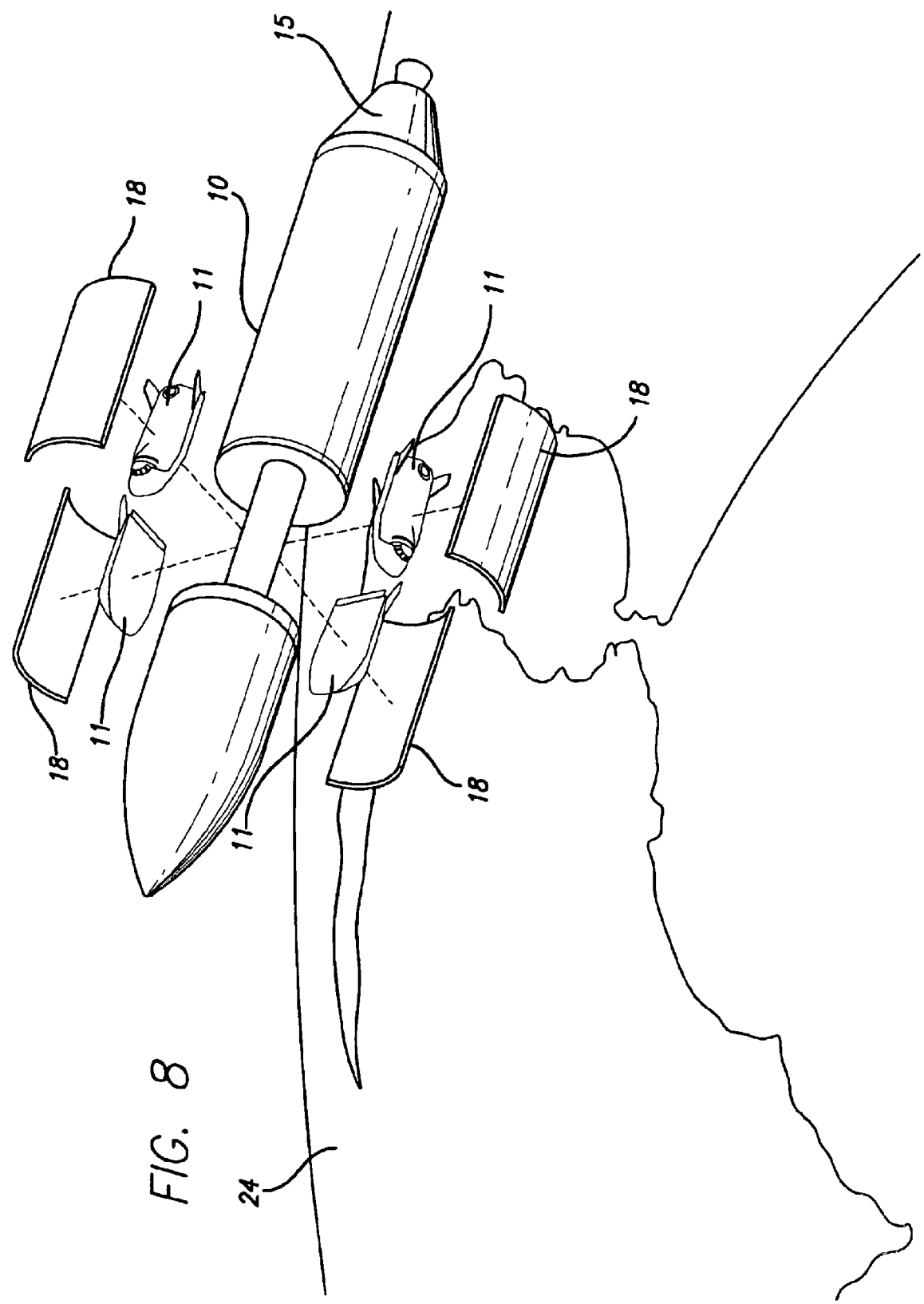

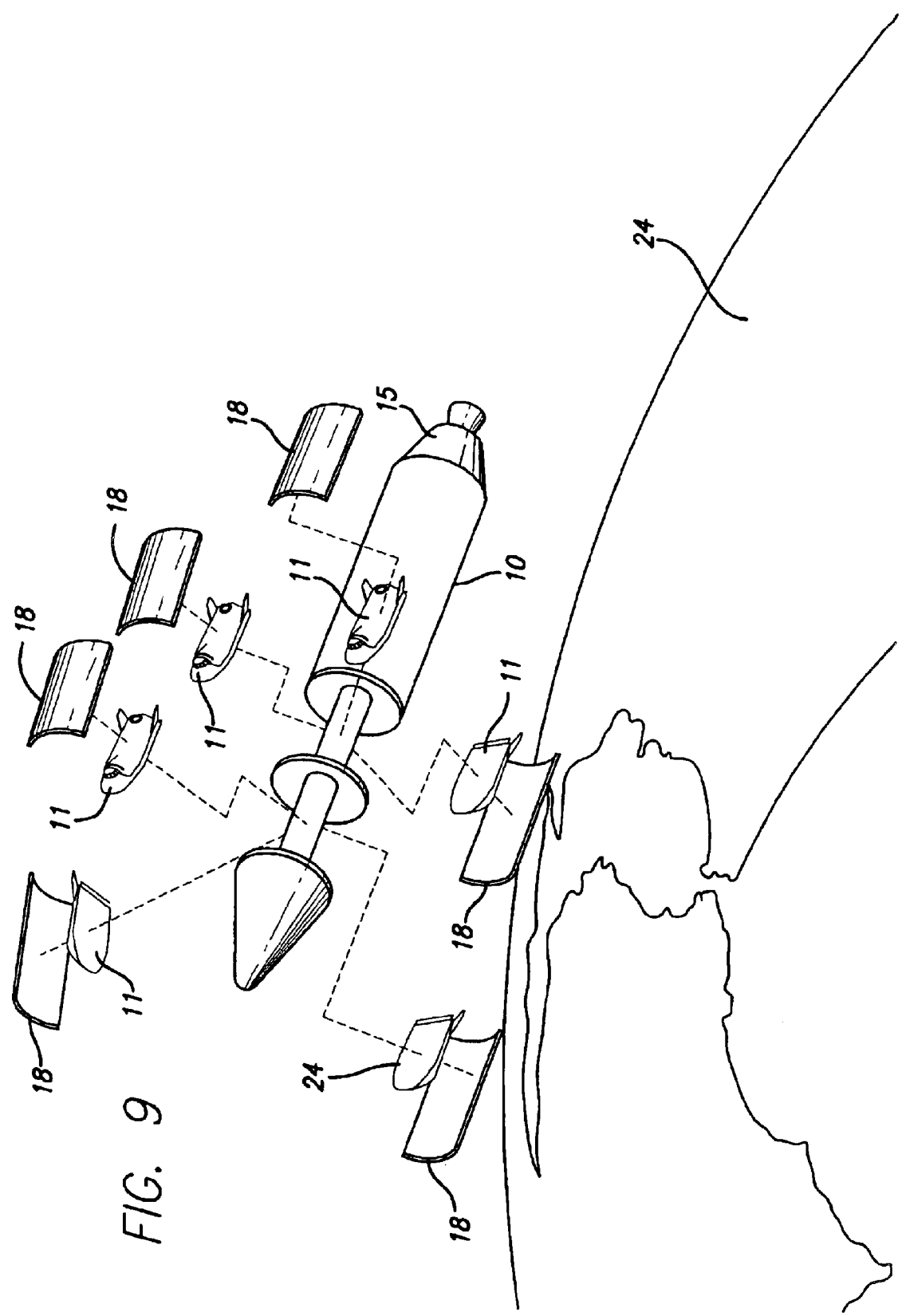

MULTI-CREW MODULES FOR SPACE FLIGHT

BACKGROUND

This invention relates to a device, system and method for launching humans into space.

Early United States manned space flights in the Mercury Program involved a single person transported in a single crew module, commonly referred to as a crew cabin or capsule, into orbit by a single launch vehicle or rocket.

As United States manned space flight progressed, the Gemini Program developed a launch vehicle which could transport two people, within the single capsule, into Earth orbit via a single launch vehicle.

The Apollo Program followed the Gemini Program. The Apollo crew module could transport three people, with one launch vehicle, into orbit. To provide for a lunar landing, the Apollo launch vehicle also transported the unmanned Lunar Module (LM) into orbit along with the Apollo capsule. Although the LM was capable of manned space flight, after it was placed in space, only the Apollo crew module could be used to transport people during the launch LM and capsule combinations were used in cooperation for manned lunar landings. However, only the Apollo capsule was capable of returning the crew members to the Earth.

The Apollo Program was followed by the Space Shuttle Program. The Space Shuttle's launch vehicle included boosters, an external fuel tank, and rocket engines (to receive propellant from the external propellant tank) on the Orbiter. A portion of the Orbiter is used as the crew cabin. As in the previous space programs, the Shuttle provides one launch vehicle for leaving the Earth and transporting one crew module (the Orbiter) into Earth orbit with one crew module (the same Orbiter) returning to the Earth.

Russia and recently China have launched human beings into space. All of the Russian launches have been one rocket launch vehicle and a single manned capsule carrying from one to three passengers. The first Chinese human launch was also one person in one crew cabin on one launch vehicle.

One of the remaining challenges in human space flight is to have a reliable system, device and/or method to provide for the launch of multiple crewed modules into orbit. A related challenge in space flight is to have a highly reliable and economical system, method or device for launching people and/or transportable payloads into orbit.

SUMMARY

A novel system provides for reliably launching human beings into orbit. A single launch vehicle can transport multiple crew modules or combinations of crew modules and payloads into orbit.

This system provides multiple crew modules per single launch vehicle. This is in contrast to the prior systems where there is only one crew module and one launch vehicle.

During a launch two or more crew modules are carried by a single launch vehicle. Each crew module is independent of the other and can carry a crew of one or more persons. Each crew module is capable of returning to Earth, with a crew, independently of the other crew modules.

The number of crew modules carried by the launch vehicle may be reconfigurable. The number and amount of crew module plus payload carried by the launch vehicle may also be reconfigurable. Launch systems and vehicles carrying multiple crew modules are described below. The below description are not intended to be an exhaustive list, nor to act as a limitation, of the possible configurations of the crew modules to launch vehicle of the method and/or system described within.

In some embodiments, the crew modules can have parachute recovery systems for safe crew survival on land or in the water. Various configurations of crew module placement on the launch vehicle are shown in the accompanying figures and described in the application. Various configurations as to the number and type of crew modules are also shown in the accompanying figures and described in the application. The crew modules once placed in orbit may also be referred to as space vehicles. A "pod" transporting payloads and/or crew modules into orbit may also be referred to as a space vehicle. Orbit as used herein refers to both low-Earth orbit and beyond into high Earth orbits.

In some embodiments the crew modules are transported into orbit within one or more detachable pods connected to the launch vehicle. Pods can be radially mounted around the circumference of the launch vehicle's propellant tank.

In other embodiments at least one of the crew modules can be directly attached to the propellant tank without a pod.

In some embodiments at least one of the crew modules is transported into orbit in-line with the main rocket. The crew module(s) may be affixed directly in front of the nose area, or may be placed in a holding bay or compartment either affixed to a portion of the launch vehicle, or formed as part of the nose area above the launch vehicle. The nose area above the main rocket may also form a detachable nose-pod for transporting crew modules within compartments or holding bays therein. Appropriate ejection and safety systems are created in the event of the need for emergency separation during launch. Modules are affixed to the launch vehicle to separate at different angles from one another to avoid collisions.

In some embodiments at least one of the crew modules is transported into orbit in-line and ahead of the launch vehicle propellant tank. The crew module(s) may be affixed directly in front of the propellant tank, or may be placed in a holding bay or compartment either affixed to a portion of the propellant tank, or formed as part of the nose area above the propellant tank. The nose area above the propellant tank may also form a detachable nose-pod for transporting crew modules within compartments or holding bays therein. Appropriate ejection and safety systems are created in the event of the need for emergency separation during launch. Modules are affixed to the launch vehicle to separate at different angles from one another to avoid collisions.

In yet other embodiments the crew modules are transported within both detachable pods and compartments or holding bays.

The pods may simply release the crew modules at the appropriate location while the pods remain attached to the launch vehicle, or the pods may be "ejectable" from the launch vehicle. In some embodiments the pods are without propulsion and the crew modules separate from the pods to continue flight separately.

In some embodiments a crew module can have its own rocket or other propulsion system. Once separated from the pod, a crew module with its own propulsion system can proceed on its own. Alternatively, the pod may be equipped with an independent propulsion system to transport either the pod with payload or at least a portion of the payload (without pod) to and/or from a separate location. A crew module can be used to transport payload and crew to and/or from a space station or other orbiting platform, site or structure.

In another form, crew modules could be mounted on a space shuttle-type launch vehicle which can be adapted for this use by relocating and connecting engines, such as those that are on the Shuttle Orbiter, to the center propellant tank.

Because of the performance of the launch vehicle described herein, there may be considerable cargo capability beyond that required to transport the crew modules so. Accordingly, a large payload, which may be as large as about 60,000 pounds, could be launched along with crew modules to the International Space Station.

In some instances empty crew modules and/or crew containing crew modules can be launched. Empty crew modules can be for use at a space station or can serve as lifeboats.

A next-generation Orbiter may be derived from the invention herein. A Space Shuttle-type Orbiter can be constructed with a crew module on a nose portion which can detach or eject and thus safely remove the crew module from the launch vehicle. The nose crew module would be a separable integrated part. Additional crew modules, both with and without crew, may be transported in a cargo hold.

In some embodiments of the launch vehicle and system, the launch vehicle is reconfigurable whereby standardized modular components, such as crew modules, pods and compartments can be varied in number, location and orientation to respond to mission needs. With the evolution of more powerful boosters and more than three engines on the propellant tank, there is also the possibility to use such a system, with its increased payload capability, to supply cargo for missions beyond Earth such as to the Moon and Mars.

By using a single design, a limited number of designs, or a limited number of variations of a design for the crew modules and/or pods, standardization of the system may be achieved. A standardized system has both the flexibility to allow for configuration of crew modules to launch vehicle and the economic benefit associated with a single or few variants of the individual reconfigurable modules.

A method and system in which a single rocket launch transports multiple crew modules, that could separate for emergency conditions, which under normal conditions enter orbit as a group. The modules can separate in orbit and, under normal conditions re-enter separately.

The system and method permits for a limited number of people per crew module, but allows for several crew modules per launch vehicle. This use of multiple crew modules can provide for larger numbers of people to be launched into orbit per launch vehicle which in-turn can reduce the cost of travel into orbit on a price-per-seat basis.

For emergency conditions during launch, each crew module could have ejection rockets. The rockets would propel the crew modules away from the distressed launch vehicle on the launch pad or at any time during launch. Appropriate provisions by testing and other appropriate mechanical and electronic guidance can avoid any re-contact of one crew module with another crew module as they separate for safety conditions. The crew modules are attached to the launch vehicle or pod at different angles relative to one another to avoid contact. The crew modules can have parachute recovery systems for safe crew survival on land or in the water.

In non-emergency conditions, multiple crew modules would be on a launch vehicle and be arranged for safe return. More than one crew module would then return to Earth separately after release from the pod or other housing in the nose area or nose-pod. This might be done by having three crew modules come down on one orbit and then three crew modules several orbits later. A set of three crew modules could come down establishing safe spacing by separate timing of the entry retro-fire and the appropriate guidance to come in and land at the same recovery base, but with differing times of arrival. Spacing could also be taken during hypersonic, supersonic and sub-sonic energy management maneuvering. The crew modules can come in with several minutes of separation between landings.

The features of the invention believed to be novel are set forth with particularity in the appended claims. The invention itself, however, both as to configuration and method of operation, and the advantages thereof, may be best understood by reference to the following descriptions taken in conjunction with the accompanying drawings.

DRAWINGS

FIGS. 4A and 4B are perspective views of one form of the system showing a launch vehicle with center propellant tanks and rocket engines forming a main rocket. There are two pods mounted 180° opposite each other, generally along the longitudinal direction of the main tanks and two additional rockets located 180° apart between the pods.

FIG. 8 is a representation of the main rocket configuration of FIG. 5 in Earth orbit showing the crew modules released and after the additional rockets have been expended.

FIG. 9 is a representation of the main rocket configuration of FIG. 6 in Earth orbit showing the crew modules released and after the additional rockets have been expended.

Figure 1:
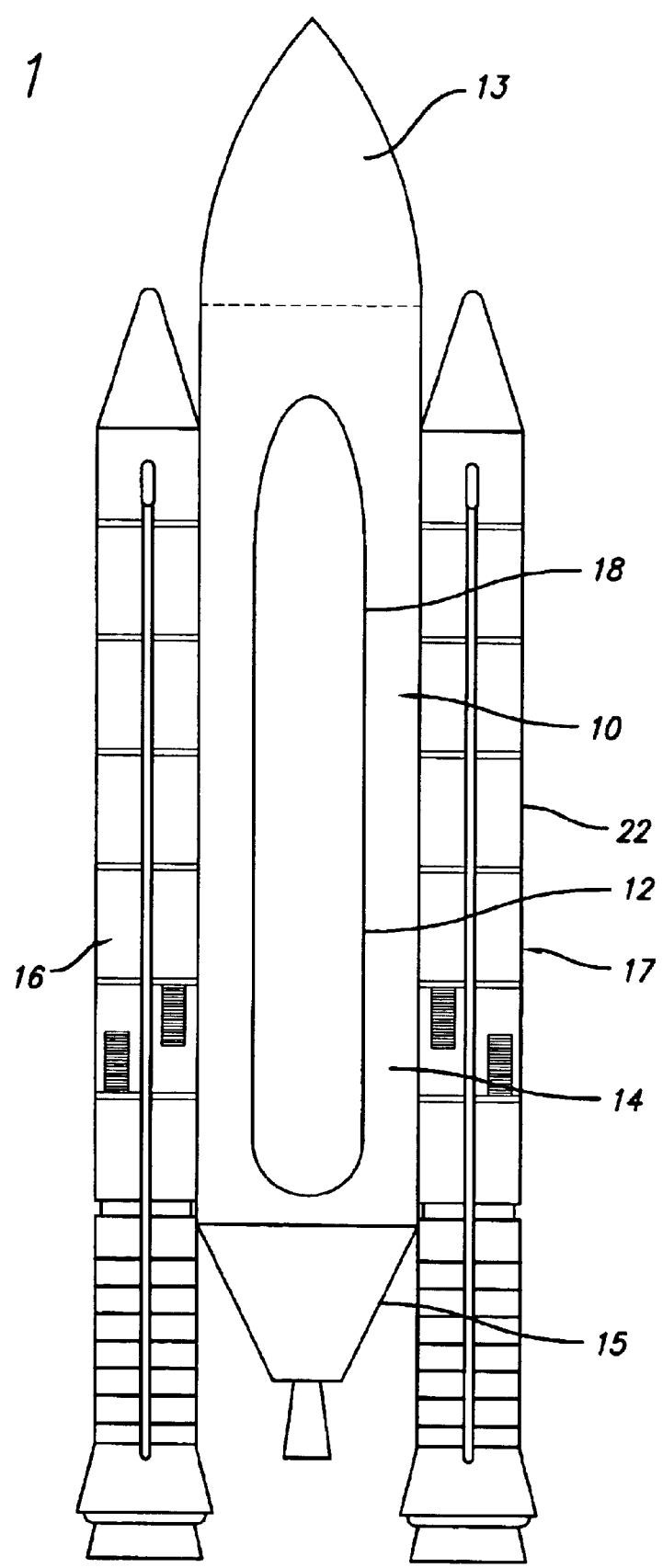
FIG. 1 is a side view of a main launch vehicle in its basic, or initial configuration, including the center propellant tanks and attached rocket engines with two solid fuel rockets on either side of the propellant tank. There is a longitudinally directed pod attached to the propellant tanks and placed between the two solid fuel rockets.

It should be appreciated that for simplicity and clarity of illustration, elements shown in the Figures have not necessarily been drawn to scale. For example, the dimensions of some of the elements are exaggerated relative to one other for clarity. Further, where considered appropriate, reference numerals have been repeated among the Figures to indicate corresponding elements.

DESCRIPTION

The description sets out different embodiments of the invention.

A system for launching a space vehicle for humans into orbit and then returning the humans from orbit comprising a launch vehicle 10, and multiple separate crew modules 11 mounted in relationship to the single launch vehicle 10. The single launch vehicle 10 is used for placing into Earth orbit the crew modules 11. The crew modules 11 can return from orbit to Earth independently of one another.

An 8-person crew module 11 can be constructed generally with the following parameters, having an approximate 30% margin of mass growth allowance. Crew module: 21.8 Klb. Escape motors: 3.6 Klb. Length: 24 ft. Width: 9 ft.

A crew module 11 can be refurbishable; and there is an ablative thermal protection system for survival of re-entry (TPS). The power sources can be battery power and non-toxic attitude control and launch escape propulsion systems. The entry load is 2-g. There can be a parachute or parafoil/airbag landing. There can also be the capability for a runway landing. The systems and devices necessary for a runway landing are well known in the art, therefore a detailed description of the runway landing systems and devices are not provided.

The launch vehicle 10 includes sufficient total impulse to ensure that the multiple separate crew modules 11 at least enter Earth orbit. The launch vehicle 10 can have as part of the overall system solid rocket boosters 16 and 17. The multiple crew modules 11 can be configured in a nested arrangement around the circumference of the main rocket 10.

Additionally or alternatively, the launch vehicle can be configured with crew modules 11 located in one or more pods 12 relatively directed along the length of the main rocket 10.

In another case or additionally the launch vehicle 10 can be configured with crew modules 11 located at least in a nose area 13 above a main rocket and in pods 12 longitudinally adjacent to the length of the main rocket 100.

Figure 7:
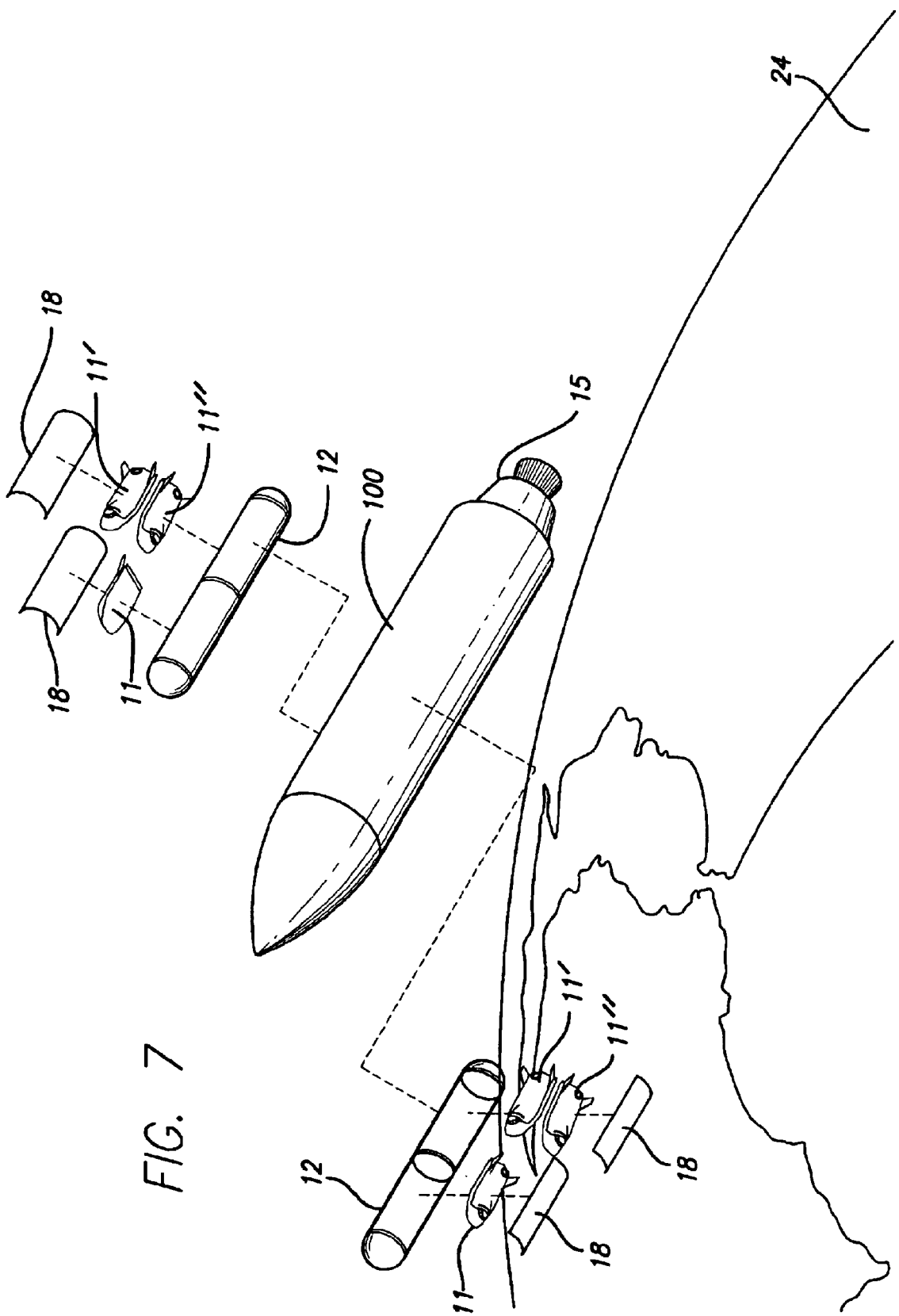
FIG. 7 is a representation of the main rocket configuration of FIGS. 4A and 4B in Earth orbit showing the crew modules released and after the additional rockets have been expended.

The launch vehicle 10 includes the main propellant tanks 14 and rocket engines 15 forming a main rocket 100. As part of the system to launch multiple crew modules with a single launch vehicle there are at least two relatively longitudinally directed pods 12 releasable connected to the main propellant tanks 14. Each pod 12 is radially spaced from the other pod about the circumference of the main rocket 10. Additional rockets 16 and 17, which may be solid rocket boosters, are located around the main rocket 10, and between the pods 12.

Where multiple crew modules 11 are located in a pod 12, the crew modules are located in a generally longitudinally spaced relationship relative to each other. However, multiple crew modules within the same pod 12, although generally in-line, are also affixed at a different pitch. As shown in FIGS. 4A, 4B and 7 crew modules 11 are angled relative to each other. The angled crew modules 11' and 11", when released from the pod, are directed away from contacting each other along the lines of arrows 1000, 1001 and 1002, as shown in FIG. 4B. The pods 12 are placed approximately 180 degrees apart from each other longitudinally along the launch vehicle main propellant tanks and generally adjacent to the main rocket.

The crew module(s) 11 can be housed in the pod 12 or a compartment 300 in the nose area 13 above the propellant tank 14 of the main launch vehicle 10. These compartments 300 could be adapted from the upper-stage structures (payload fairings) of the Delta IV 'Heavy' or the Atlas V EELV.

In those instance when the propellant tank has been fitted with engines 15 the nose area may be considered to be above the "main rocket" as opposed to above the engineless propellant tank. Since the creation of the Shuttle system there have been advancements in engines. One suitable engine for connection to the propellant tank and use during launch, is the RS-68 engine, from the Delta IV heavy launch vehicle. Connecting three RS-68 engines beneath the propellant tank 14 should provide adequate thrust, along with the thrust from the solid rocket boosters 16 and 17 to achieve launch into orbit. Other existing engines such as the Atlas III Centaur stage & Atlas V payload fairing structures may also be suitable.

Crew modules 11 in the pod 12 and/or compartment 300 are covered by a shroud 18 affixed to, or formed by, a wall of the pod 12 or compartment 300. The shroud is a fairing or covering type structure. The shroud 18 is separable in part from the pod 12, the separation being effected at an appropriate stage after launch of the space vehicle such that the crew module can be deployed. FIGS. 7, 8 and 9 show the released shroud 18 and released crew modules 11. The crew angled modules are initially, at release, directed along different paths to avoid contact or collision. The shroud 18 can be made of a frangible material facilitate emergency removal or ejection of the crew module(s). The solid rocket boosters are not shown as they would already have disassociated from the launch vehicle.

The release of a shroud 18 in the nose area 13 permits deployment of a crew modules 11 separately from the nose area 13. The shroud 18 is intended for covering and protecting the enclosed crew modules 11 during launch to beyond the atmosphere.

Figure 2A:
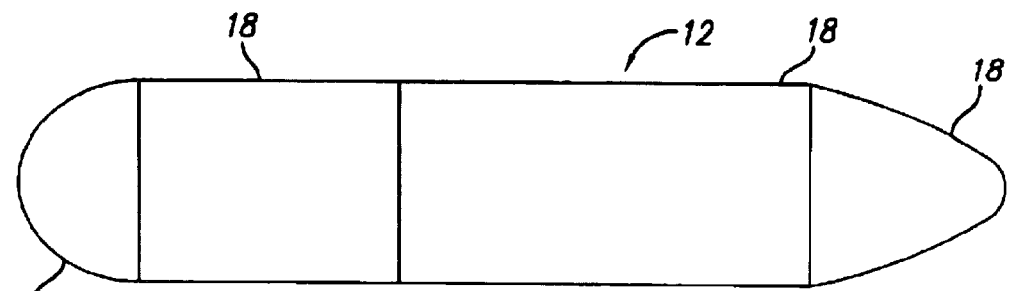
FIG. 2a is a detailed outside view of the pod.
Figure 2B:
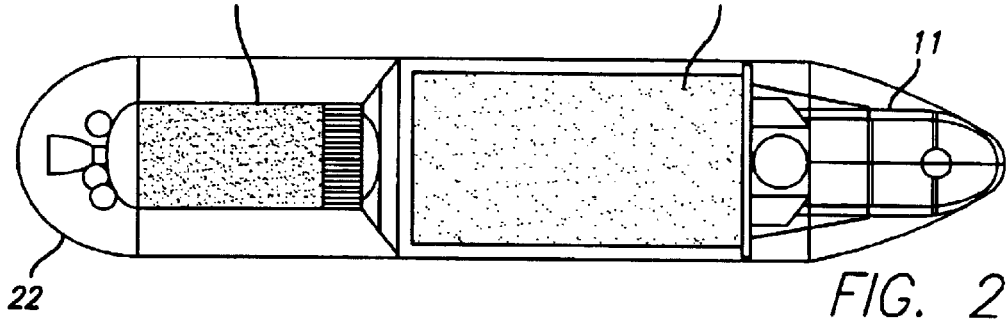
FIG. 2b is an internal view of a pod showing a crew module in the front portion of the pod, a cargo payload behind the crew module, and a rocket stage for further transport of the combination of a crew module and payload.

The internal configurations of pods 12 is variable. FIGS. 2b, 2d, and 2e show but a few possible variations of the internal configuration within a pod. Behind a crew module 11, there can be a payload 19. Behind the payload 19 there is a rocket stage 20 for the crew module and the payload. The crew module(s) 11 also include a power supply for powering the crew module(s) 11. The rear-shroud 22 of the pod 12 is released prior to operation of the pod's rocket stage 20.

Figure 2C:
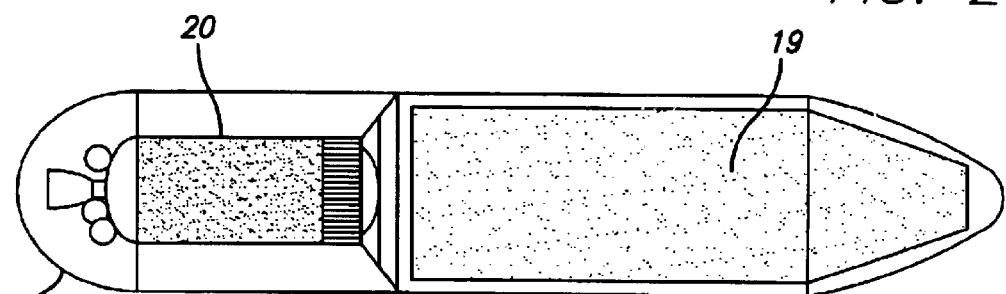
FIG. 2c is an internal view of a different pod arrangement wherein in place of the crew module there is additional payload volume in the pod.
Figure 2D:
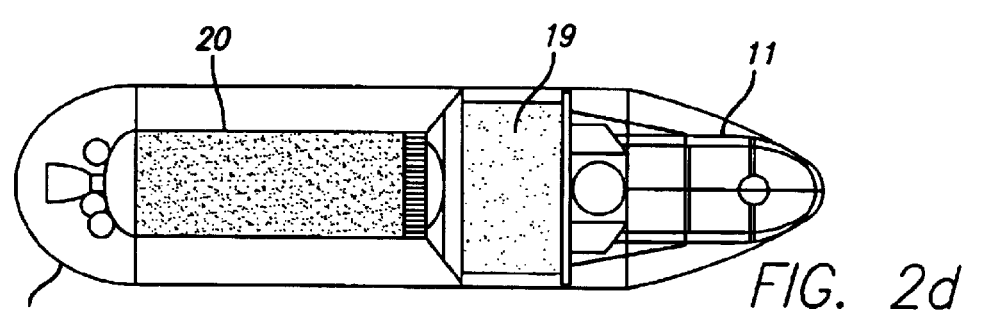
FIG. 2d is another internal view of a pod.
Figure 2E:
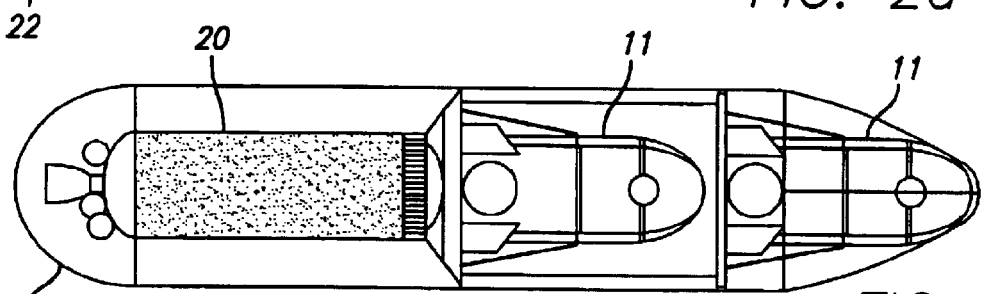
FIG. 2e is an internal view of a pod with multiple crew modules.

Shown in FIG. 2c is a pod used to transport a payload 19 and which has a separate rocket stage 20 for the payload 19.

Figure 3:
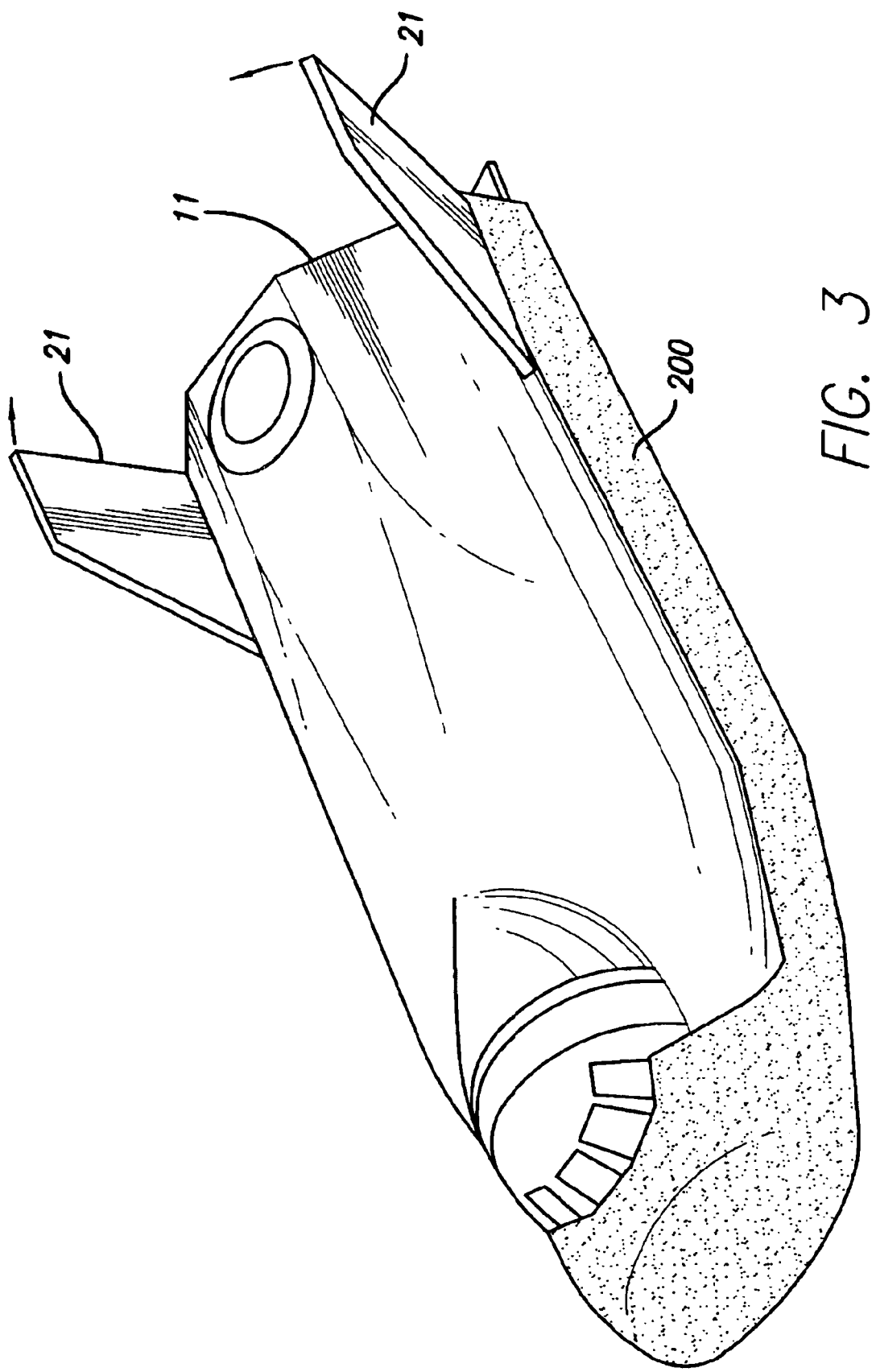
FIG. 3 is a perspective view of a crew module showing extendable fins which maybe folded during pod storage.
Figure 6:
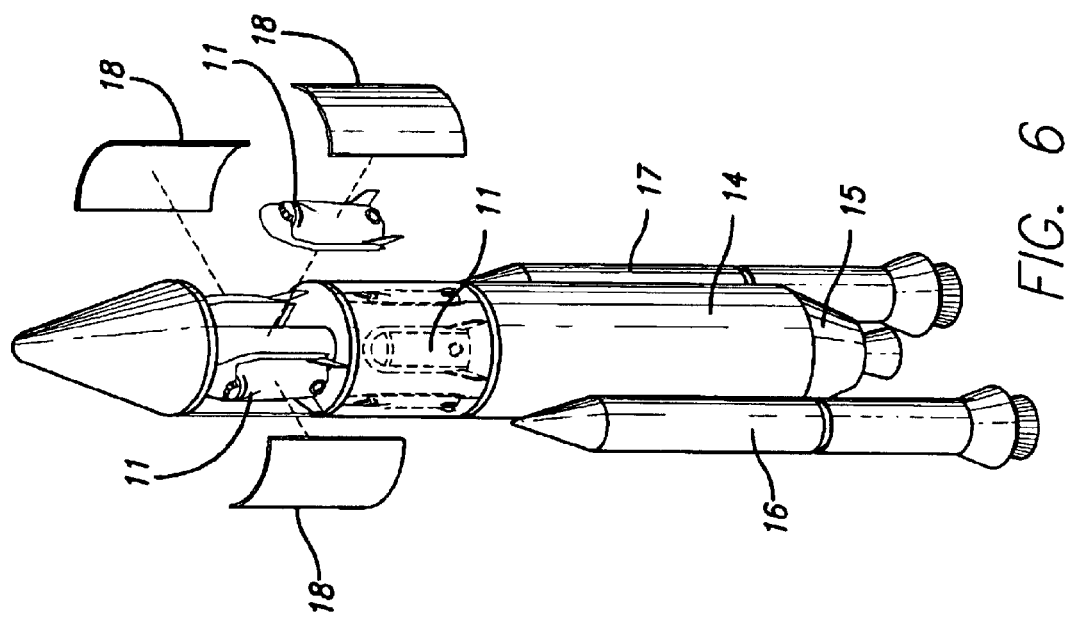
FIG. 6 is an alternative configuration where multiple crew modules are housed in or adjacent to the nose area above a main rocket.

As shown in FIG. 3 the crew module 11 may have foldable flight elements such as wings or fins 21 to facilitate close nesting when in the closed relationship with the main launch vehicle 10 or a pod 12 associated with main rocket 10. The flight elements may also be fixed (not shown). The fins 21 shown in FIG. 3 unfold essentially to permit independent control and operation of the crew module 11 for atmospheric flight. Heat shield tiles or other suitable thermal protection insulating materials 200 are used on the crew module 11 for re-entry. Extendable flight elements such as wings may also be attached to a crew module to enhance atmospheric flight and landing.

The launch system can provide for the launch of multiple persons and payloads. As such it may be a suitable replacement for the Space Shuttle Orbiter and instead use pod 12 and/or nose area 13 compartments 300 to transport crew modules 11 and/or payload 19.

Each pod can be a modularized component and configured to mission needs. They may act to only transport cargo or carry both crew modules and cargo, or crew modules only. Configuration options include, but are not limited to, the number of crew modules or payloads in a pod, the internal configuration of each pod.

Figure 5:
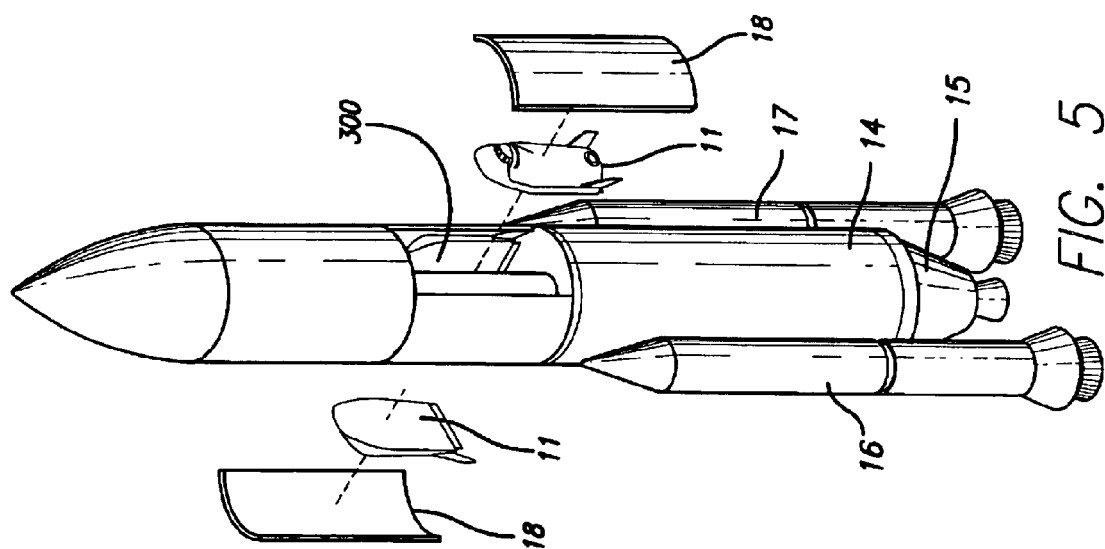
FIG. 5 is a different variation of the system showing the main centerline of the main rocket and two additional rockets mounted to either side of the main rocket. Multiple crew modules are located above the main rocket in the nose area, in a nested relationship around the axis of the main rocket.
Figure 11:
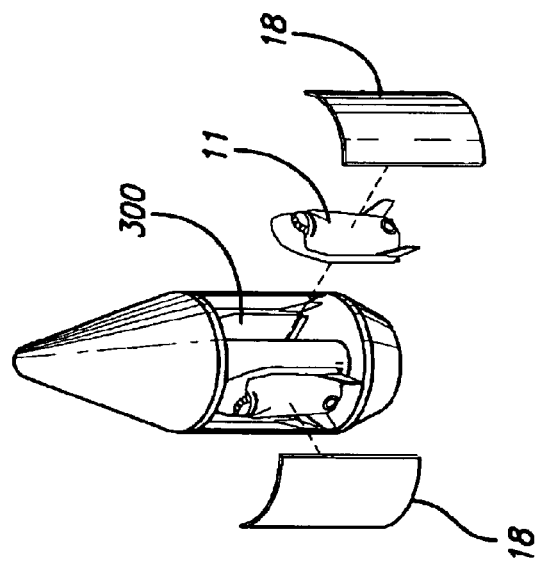
FIG. 11 is a component view of the multi-stage nose pod of FIG. 5 after detachment from the main rocket.

Referring now to FIG. 11, a detachable nose-pod 300 is shown separated from a launch vehicle such as that shown in FIG. 5. In this embodiment the nose-pod is part of a multi-stage launch vehicle with the nose-pod 350. The detachable nose-pod 350 stage can also be a standardized component and configured to match mission needs. Configuration options for the nose-pod 350 may include, but are not limited to, the number of compartments 300, the number of crew modules 11 and/or the number of payloads 19. Those skilled in the art will recognize that there are many configurations, for the side mounted pods and nose pods Non-detachable compartments 300 may also be reconfigurable and modularized.

Figure 10:
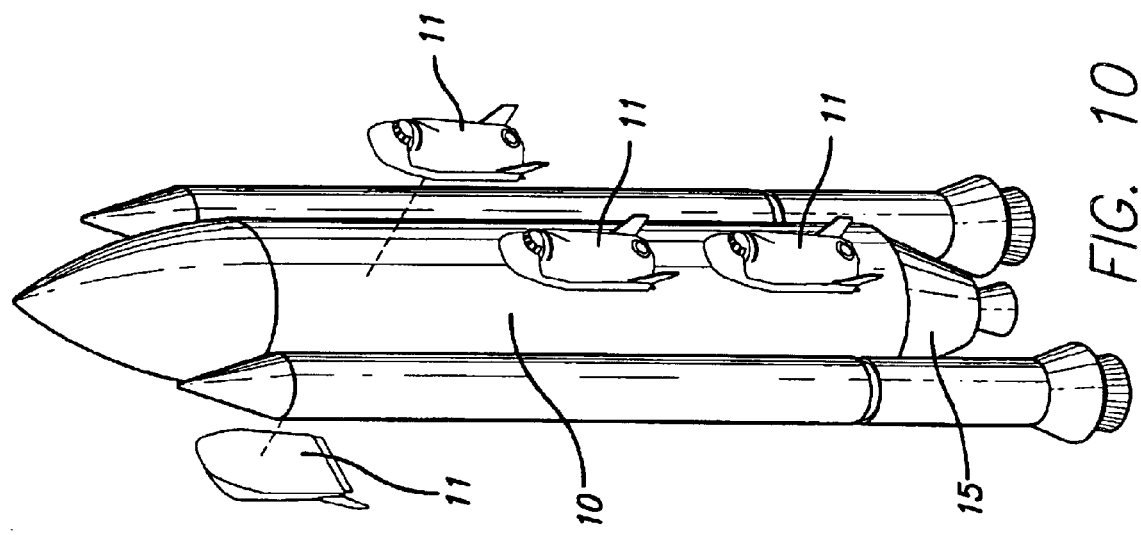
FIG. 10 is an alternative configuration where multiple crew modules are directly connected to the launch vehicle along the centerline of the main rocket.
Figure 13:
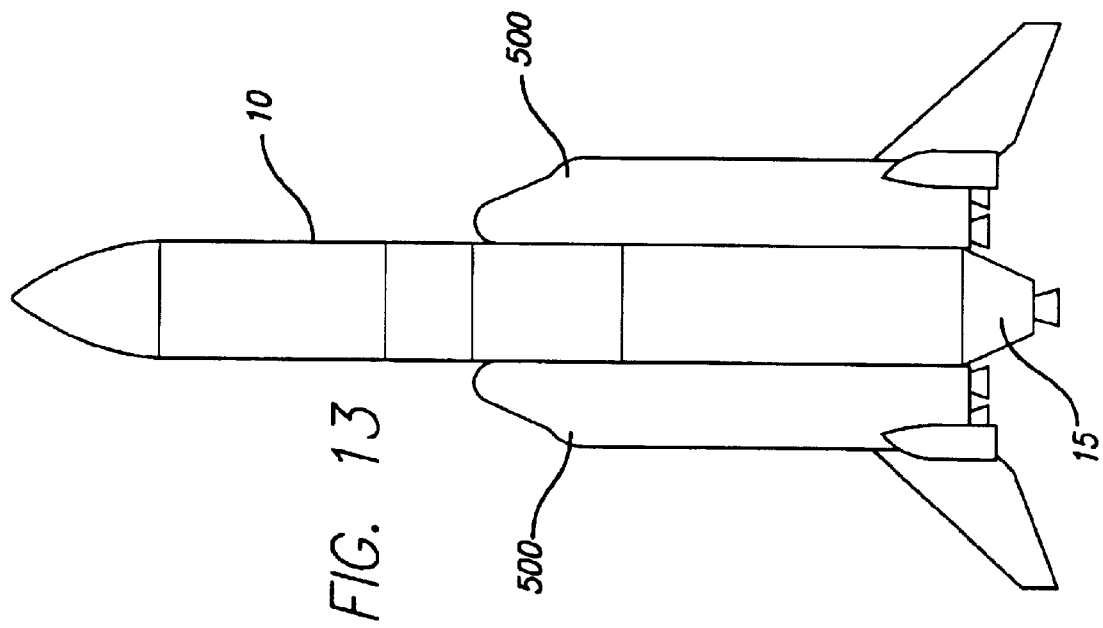
FIG. 13 is a heavy lift launch vehicle (60 to 715 mt) using combinations of kerosene flyback boosters 500 and expendable propulsion modules. These can be multiple crew modules associated with the main rocket and/or pods containing crew modules.
Figure 12:
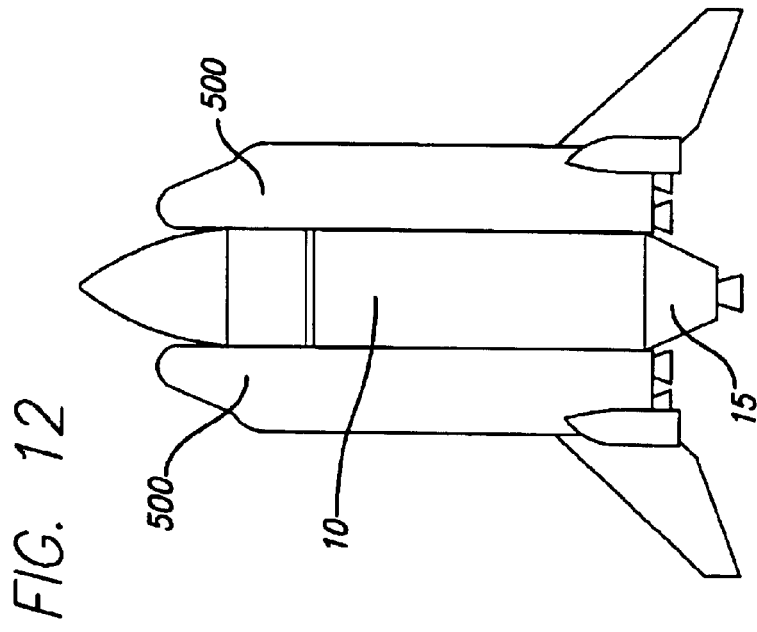
FIG. 12 is an extrapolation of FIG. 1 where the RSRM is replaced with flyback boosters 500. These can be multiple crew modules associated with the main rocket and/or pods containing crew modules.

In another embodiment, shown in FIG. 10, at least two relatively longitudinally directed crew modules 11 and 11' are releasably connected directly to the main propellant tanks 14. The crew modules can be released from the propellant tanks 14 mount at the appropriate time after launch to achieve orbit. The crew modules 11 attached in this fashion can also be released pre-orbit should an emergency situation occur and return to Earth with crew.

The launch system can use the current STS ascent trajectory for the tank and disposal orbit. Overall this minimizes ground infrastructure modifications.

This system allows the government, for instance NASA, or others to develop a launch configuration for one crew module with cargo (payload) for the purposes of NASA missions.

The system provides for parallel development by the private sector to use a similar launch vehicle, and similar crew modules. These can use multiple crew modules, thereby enabling safe ejections, safe-landings in event of an emergency of all personnel on board. This allows economical utilization of multiple crew modules without having to design one or two very large containers for crew people that would require a new, very expensive development and not utilize the same similar infrastructure support.

The economics involved allow for parallel launching teams to launch both NASA missions and private sector missions from the same launch pad. The purposes of the launches could, of course, be different. One would be for civil, government purposes for exploration or science. The other missions would be for commercial, adventure travel by growing numbers of non-professional space flight participants. This would likely involve still a significant subsidizing of the private sector launch of adventure travelers, non-professional space flight participants, for a period of a number of years until this system is able to have an economic return from the cost, the price-per-seat charge to the using organization for the traveler to be able to defray the launch costs.

The reusable portions of that launch vehicle, economically supported by a higher flight rate, would lead toward increased reliability. Space access to large numbers of people, and the habitat facilities in space to support them for longer stays in orbit, can be appropriately designed. This can also lead toward close utilization of those same facilities of habitats in space and access to space that support the government exploration and civil space-science missions in a more economical fashion. This would justify the subsidy and the utilization of the R&D expenses by the government of the facilities and the infrastructure to be used commercially by the private sector for their commercial for-profit missions.

The use of six of the 8-person crew modules, would decrease cost by increasing the number that are manufactured. Thus there would be six modules for eight people, or forty-eight total people, who survive in similar ways in the case of emergency, rather than going to the high expense of building a new 48-person crew module for one crew module per one launch vehicle. There can be variations on the number of persons for the crew modules. There could be two people per crew module and two crew modules per launch rather than one with two people versus one with four people. The numbers and configurations are such that they can be varied.

Many other forms of the invention exist each differing from the other methods of detail only. The invention is to be determined by the following claims.

I claim:

1. A system for launching a space vehicle with crew modules for humans into orbit comprising:
    a launch vehicle; and
    at least two separate crew modules, each crew modules capable of returning separately from earth orbit, mounted in relationship to the launch vehicle;
    wherein the launch vehicle, separate from the crew modules, includes sufficient total impulse to ensure that two or more separate crew modules enter earth orbit.

2. The system as claimed in claim 1 wherein the separate crew modules are nested around the circumference of the launch vehicle.

3. This system as claimed in claim 1 wherein the multiple separate crew modules are located in a pod relatively directed along the length of the launch vehicle.

4. The system as claimed in claim 1 wherein the separate crew modules are located at least in a nose area above a booster and in a pod area longitudinally adjacent to the length of the launch vehicle.

5. The system as claimed in claim 1 wherein the launch vehicle includes at least two longitudinally directed pods, at least two crew modules being contained within the pods.

6. The system as claimed in claim 1 wherein the crew modules are housed in at least one pod and in a nose area compartment above a rocket stage of the launch vehicle, and wherein the crew module in the pod is housed in a shroud formed by an outer wall of the pod.

7. The system as claimed in claim 6 wherein the shroud is separable from the pod, the separation being effected at an appropriate stage after launch of the space vehicle such that the crew module can be deployed apart from the pod.

8. The system as claimed in claim 1 wherein at least one of the at least two crew modules is located in or adjacent to a nose area at the top of a launch vehicle and wherein release of a shroud at least partly around the module permits for deployment of the module separately from the area adjacent to or at the nose.

9. The system as claimed in claim 1 wherein multiple crew modules are located in a pod, the crew modules being located in a longitudinally spaced relationship relative to each other, and the pod being located longitudinally adjacent to the launch vehicle.

10. The system as claimed in claim 1 wherein the separate crew modules are located in a pod longitudinally mounted relative to the launch vehicle, and wherein longitudinally located relative to the crew modules there is a payload, and relative to the payload there is a rocket stage for the crew modules and payload.

11. The system as claimed in claim 1, further comprising:
   at least two separate crew modules;
   at least one pod which includes a power generating source for powering the crew modules and additionally a payload separate from the crew modules; and
   a separate rocket stage for the payload and crew module, the separate rocket stage being operable at the rear of the pod.

12. The system as claimed in claim 1 wherein multiple crew modules are nested in radially spaced relationship in a nose area above the launch vehicle and wherein removal of a shroud from the nose area permits separation of the multiple crew modules.

13. A system for launching multiple crew modules into Earth orbit comprising:
   at least two separate crew modules, each mounted longitudinally on the side of a launch vehicle;
   wherein the launch vehicle, separate from the crew modules, has sufficient total impulse for launching two or more of the crew modules each crew module capable of returning with humans from earth orbit.

14. The system as claimed in claim 5 wherein each crew module containing pod is radially spaced from the other crew module containing pod about the circumference of the launch vehicle and wherein booster rockets are also located around the launch vehicle.

15. A system for launching a space vehicle with multiple separate crew modules into orbit and for returning humans from orbit comprising:
   a launch vehicle;
   a plurality of separate crew modules mounted in relationship to the launch vehicle;
   a single rocket, separate from the crew modules, used for launching the plurality of space crew modules; and
   at least two of the separate crew modules returning with humans from orbit to Earth.

* * * * *